United States Patent [19]

Shiraishi et al.

[11] Patent Number: 4,958,057

[45] Date of Patent: Sep. 18, 1990

[54] TRANSFER-TYPE PLASMA TORCH WITH RING-SHAPED CATHODE AND WITH PROCESSING GAS PASSAGE PROVIDE INTERIORLY OF THE CATHODE

[75] Inventors: Hiroshi Shiraishi; Nobuo Tajima; Tsuyoshi Shinoda; Nobuyoshi Hirotsu, all of Kitakyushu, Japan

[73] Assignee: Nippon Steel Corporation, Tokyo, Japan

[21] Appl. No.: 340,188

[22] Filed: Apr. 19, 1989

[30] Foreign Application Priority Data

Apr. 26, 1988 [JP] Japan ................................ 63-102992

[51] Int. Cl.[5] .............................................. B23K 9/00

[52] U.S. Cl. ............................ 219/121.5; 219/121.51; 219/121.52; 219/121.48; 219/75; 219/121.57; 219/130.4

[58] Field of Search ...................... 219/121.50, 121.51, 219/121.52, 121.48, 118, 74, 75, 121.36, 137 PS, 130.4, 121.57

[56] References Cited

U.S. PATENT DOCUMENTS

| | | | |
|---|---|---|---|
| 3,250,893 | 5/1966 | Nestor | 219/121.57 |
| 3,914,573 | 10/1975 | Muehlberger | 219/121.49 |
| 4,004,076 | 1/1977 | Paton et al. | 219/121 PM |
| 4,037,043 | 7/1977 | Segsworth | 13/9 |
| 4,146,772 | 3/1979 | Jelmorini | 219/121.54 |
| 4,410,792 | 10/1983 | Komura et al. | 219/121.54 |
| 4,564,740 | 1/1986 | Paton et al. | 13/18 |
| 4,767,907 | 8/1988 | Otani et al. | 219/121.54 |

FOREIGN PATENT DOCUMENTS 0178288 8/1988 European Pat. Off. .

OTHER PUBLICATIONS

Japanese Patent Unexamined Publication No. 54-136193, 10-1979.

*Primary Examiner*—M. H. Paschall
*Attorney, Agent, or Firm*—Pollock, Vande Sande & Priddy

[57] ABSTRACT

A transfer-type plasma torch may be used to heat objects, for example, to heat molten steel at a certain stage of being supplied from a converter to a continuous casting mold. After a trigger electric discharge has been produced between the cathode and the ignition anode of the plasma torch, an electric discharge is effected between the cathode and an object to be treated that is set as the anode. The plasma torch includes a cylindrical cathode-holding member having therein a space allowing for the flow of coolant, an ignition anode disposed within the cathode-holding member, and a ring-shaped cathode disposed on an inner periphery of the cathode-holding member and positioned below the tip of the ignition anode, with the tip portion of the cathode projecting downwardly from the bottom face of the cathode-holding member. This arrangement eliminates a conventional nozzle, thereby allowing for a reduction in a diameter of the entire torch while enabling a relative increase in the diameter of the cathode. Thus, the plasma torch exhibits a large capacity for arc current.

4 Claims, 5 Drawing Sheets

TRANSFER-TYPE PLASMA TORCH WITH RING-SHAPED CATHODE AND WITH PROCESSING GAS PASSAGE PROVIDE INTERIORLY OF THE CATHODE

BACKGROUND OF THE INVENTION

1.FIELD OF THE INVENTION

The present invention relates to transfer-type plasma torches and, more particularly, to the electrode structure in the plasma generating portion. Transfer-type plasma torches which the present invention is concerned with may be used to heat objects, for example, to heat molten steel at a certain stage of being supplied from a converter to a continuous casting mold.

2. DESCRIPTION OF THE PRIOR ART

Induction heating or heating by means of a plasma torch is effected to heat an object such as molten steel. There are two types of plasma torches, one being a transfer type, and the other being a non-transfer type. In a plasma torch of the transfer type, an object to be heated is set as the anode, and electric discharge is effected between the cathode of the plasma torch and the object to be heated. In a plasma torch of the non-transfer type, electric discharge is effected between the cathode and the anode of the plasma torch, a processing gas is supplied to the space between these electrodes, and the gas passed through the space between the cathode and the anode is applied to the object to be heated.

A processing gas (preferably an inert gas) such as $N_2$ or Ar is also used in the case of transfer type plasma torches for the purpose of shielding the electrodes from the ambient atmosphere. However, non-transfer type plasma torches consume a much larger amount of processing gas. Because of this large amount of consumption of a processing gas, non-transfer type plasma torches involve high operation cost.

FIGS. 7, 8, and *9a* to *9c* show a conventional transfer-type plasma torch disclosed in Japanese Patent Unexamined Publication No. 54-136193. FIG. 7 is a longitudinal section of the end portion of the plasma torch, FIG. 8 is a view of an electric circuit including the plasma torch, FIGS. *9a*, *9b*, and *9c* are views showing in detail different arrangements which may be provided at the tip portion of the cathode of the plasma torch.

The conventional plasma torch has an auxiliary electrode 19 in the center, a cylindrical cathode 17 around the auxiliary electrode 19, and a cylindrical nozzle 18 around the cathode 17.

A processing gas is caused to flow both into the gap between the auxiliary electrode 19 and the cathode 17 and into the gap between the cathode 17 and the nozzle 18. The flow rates of the processing gas are set in such a manner that the ratio between the flow in the gap between the auxiliary electrode 19 and the cathode 17 and that in the gap between the cathode 17 and the nozzle 18 is 1:5 to 8. Thus, the flow of processing gas in the gap between the cathode 17 and the nozzle 18 corresponds to the majority of the entire flow.

With the conventional plasma torch, plasma is generated in the following manner. First, the processing gas is introduced. At the time of ignition, a high voltage at a high frequency is applied to the gap between the auxiliary electrode 19 and the cathode 17, thereby causing electric discharge in this gap. Thereafter, a DC voltage is applied by using the cathode 17 as the minus electrode and the auxiliary electrode 19 as the plus electrode, thereby generating a pilot arc. When the generation of the pilot arc has been achieved in this way, the application of the high-frequency voltage for the ignition is terminated. Subsequently, a DC voltage is applied by using the cathode 17 as the minus electrode and an object 20 to be heated as the plus electrode, thereby generating a main arc therebetween. The object 20 is heated by the main arc.

The application of DC voltage to the cathode 17 and the auxiliary electrode 19 is continued also during the time in which the main arc keeps generating, so that the pilot arc is always generated during that time.

The pilot arc serves, together with the introduction of a large amount of cool processing gas into the gap between the cathode 17 and the nozzle 18, to prevent any electric discharge from the cathode 17 to the nozzle 18 and, hence, to prevent any damage to the nozzle 18.

As regards the configuration of the cathode 17, in order to ensure that the plasma arc generating region is stably formed, the central passage of the cathode 17 should as much as possible be provided with an enlarged portion which has its length set at a dimension 0.1 to 0.2 times the outer diameter $D_1$ of the cathode 17, and has its diameter $D_1$ in the vicinity of the surface of the cathode 17 set at a dimension 2 to 5 times the diameter $d_1$ of the adjacent portion of the central passage. This enlarged portion of the central passage may either be shaped like a frustum of a cone or a cylinder. If this arrangement is provided, it is possible to ensure, in addition to stable formation of the plasma arc generating region, dispersion of the plasma arc generating region over the entire area of the enlarged portion of the central passage, this dispersion enabling a reduction in the current density on the electrode surface.

The electric circuit shown in FIG. 8 includes a power source 21 connected to the cathode 17 and the auxiliary electrode 19, a main arc power source 23 for generating a main arc in the gap between the cathode 17 and the object 20 to be heated, and a high frequency generator 22.

The above-described conventional transfer-type plasma torch, however, involves the following disadvantages. In order to ensure stable formation of the plasma arc generating region as well as dispersion of the plasma arc generating region over the entire area of the enlarged portion of the central passage and, hence, a reduction in the current density on the electrode surface, a certain number of charged particles which is large enough to compensate for the space charge adjacent to the effective surface of the electrode must be always generated and supplied by the pilot arc. Furthermore, in order to maintain this space charge stably in the vicinity of the electrode, and simultaneously prevent any damage to the edge portion at the tip of the cathode due to displacement of the main arc to this portion, any reduction in the heating efficiency due to failure of the proper convergence of the plasma arc, and any damage to the nozzle due to electric discharge from the cathode to the nozzle, it is necessary to supply a large amount of cool processing gas into the gap between the cathode 17 and the nozzle 18.

With the arrangement of the conventional plasma torch, therefore, the supply of a large amount of processing gas to the nozzle and into the gap between the nozzle and the cathode is essential, as mentioned before.

Thus, the provision of a nozzle, which has conventionally been adopted, involves the following drawbacks:

(1) The outer diameter of the plasma torch becomes three times or more that of the cathode, causing a great increase in weight, and also an increase in the space required for installation.

(2) Since a large amount of processing gas has to be consumed, this is disadvantageous in terms of economy.

(3) Since the gas has to be supplied in two lines while nozzle cooling water is also necessary, the structure of the torch and the systems for supplying the gas and the water are inevitably complicated.

Furthermore, with the conventional arrangement, the pilot arc must be always generated during operation.

SUMMARY OF THE INVENTION

The present invention has been accomplished to eliminate the above-described problems. An object of the present invention is to provide a transfer-type plasma torch which does not require the use of the conventionally-provided nozzle, thereby allowing for a reduction in diameter of the entire torch while enabling a relative increase in diameter of the cathode, the plasma torch thus being capable of exhibiting a large capacity for arc current.

In order to achieve the above-stated object, the present invention provides a transfer-type plasma torch which has a cathode and an ignition anode and in which, after a trigger electric discharge has been produced between the cathode and the ignition anode, electric discharge is effected between the cathode and an object to be treated that is set as the anode. The plasma torch comprises a cylindrical cathode-holding member having therein a space allowing the flow of a coolant, an ignition anode disposed within the cathode-holding member, and a ring-shaped cathode threaded into or fitted on an inner periphery of the cathode-holding member and positioned below the tip of the ignition anode, with the tip portion of the cathode projecting downwardly from the bottom face of the cathode-holding member. A processing gas flow passage is defined by the space formed between the cathode-holding member, the hollow cathode, and the ignition anode.

The cathode-holding member may preferably comprise a closed-end double cylinder and an inner cylinder disposed in the double cylinder, a plurality of grooves being formed in the surface of the portion of the cathode-holding member opposite to that on which the cathode is mounted. The plurality of grooves and the inner cylinder define a portion of the coolant flow space. The outer peripheral surface and the bottom surface of the cathode-holding member may preferably be covered with an electric insulator.

According to the present invention, because the ring-shaped cathode is mounted on an inner periphery of the cathode-holding member cooled by a coolant, and because the cathode is mounted in such a manner as to partially project from the bottom face of the cathode-holding member, the position of an arc spot formed on the end face of the cathode can be stably determined in the center.

This advantage will be appreciated if consideration is given to the theoretical background that an arc spot is the point at which thermoelectrons are discharged. The bottom surface and the corner surface of the cathode-holding member, which are cooled, have too low a temperature to provide a point of discharge of thermoelectrons and, hence, to allow easy formation of an arc spot. On the other hand, the end face of the cathode, which is projected from the cathode-holding member and is at a high temperature, allows concentration of the electric field thereon and, hence, allows the formation of an arc spot.

Further, because the position of the arc spot on the cathode end face can be stably determined in the center, this makes it possible to eliminate both a nozzle body and a processing gas supplied to the gap between the nozzle and the cathode, which have been necessary with the prior art.

The elimination of the nozzle in turn makes it possible to adopt, as the torch diameter, a dimension which is approximately one third of the diameter of conventional plasma torches. Thus, the plasma torch can be compact.

In addition, the plasma does not lose its stability even when the pilot arc is extinguished immediately after the ignition of the main arc.

The ring-shaped cathode is provided below the tip of the ignition anode. Therefore, the ignition anode is prevented from becoming melted and wasted by a main arc generated from the cathode.

If the plurality of coolant flow grooves are formed in the opposite surface of the cathode-mounting portion of the cathode-holding member, the cathode can be cooled to a sufficient extent.

If the outer peripheral surface and the bottom surface of the cathode-holding member are covered with an electric insulator, this arrangement enables, in combination with the cooling effect, to completely eliminate the generation of any plasma arc from the cathode-holding member. In this case, therefore, the electric field is properly concentrated on the cathode, thereby enabling stable and highly efficient generation of a plasma arc.

Further according to the present invention, because the processing gas flow passage is defined by a space formed between the cathode-holding member, the hollow cathode, and the ignition anode, the ignition anode can be cooled by the processing gas and be thus protected.

If the reduction in diameter of the torch, and the sufficient cooling of the cathode are combined with the arrangement in which the cathode is mounted by a threading or fitting method, this brings forth advantages such as low level of thermal stress. Low thermal stress and other advantages enable the diameter of the cathode to be set at a much larger dimension as compared to those conventionally adopted, thereby achieving a large capacity for arc current.

The formation of the cooling grooves in the cathode-holding member allows the cathode to be cooled very effectively, thereby enabling a great increase in usable life of the cathode. If the cathode is held in position through threads or engagement portions, it is prevented from dropping off.

BRIEF DESCRIPTION OF THE DRAWINGS

FIGS. 7, 8, 9*a*, 9*b*, and 9*c* are views showing a conventional plasma torch, wherein FIG. 7 is a longitudinal section of the end portion of the plasma torch, FIG. 8 is a block diagram showing an electric circuit including the plasma torch, and FIGS. 9*a*, 9*b*, and 9*c* are views showing in detail different arrangements which may be provided at the tip portion of the cathode of the plasma torch.

DETAILED DESCRIPTION OF THE PREFERRED EMBODIMENTS

The preferred embodiments of the present invention will be described hereunder with reference to FIGS. 1 to 6.

Figure 1:
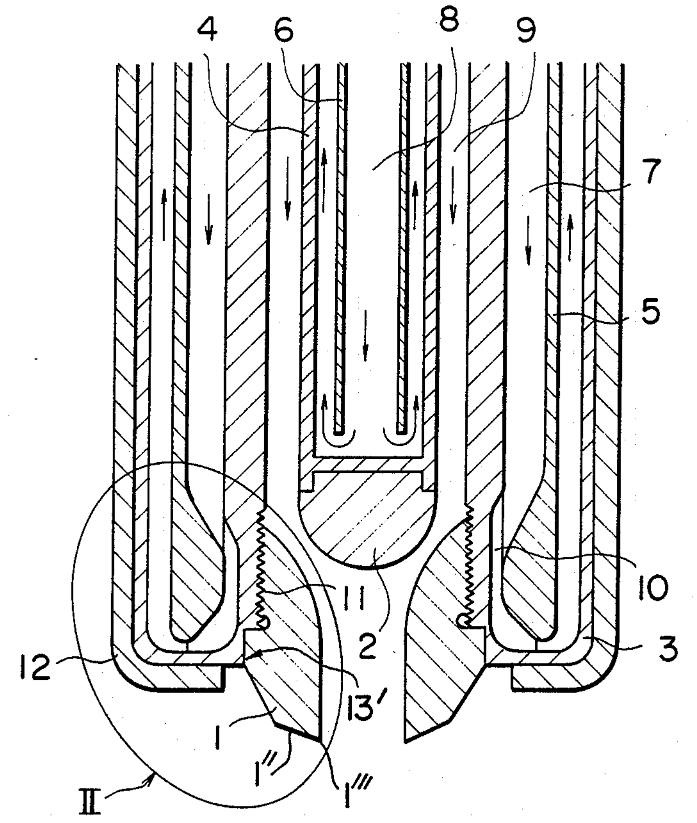
FIG. 1 is a fragmentary longitudinal section of an embodiment of the transfer-type plasma torch of the present invention.
Figure 2:
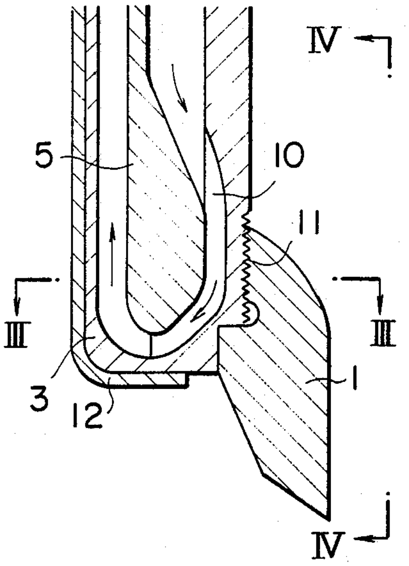
FIG. 2 is a view showing in detail the portion denoted by II in FIG. 1.
Figure 3:
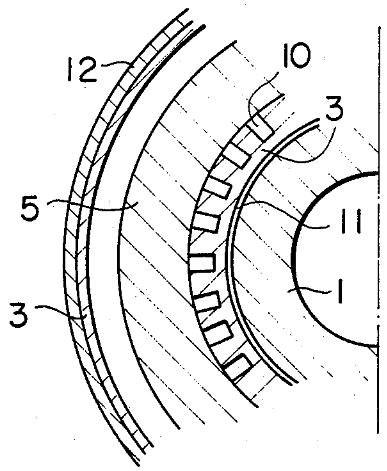
FIG. 3 is a section taken along the line III—III shown in FIG. 2.
Figure 4:
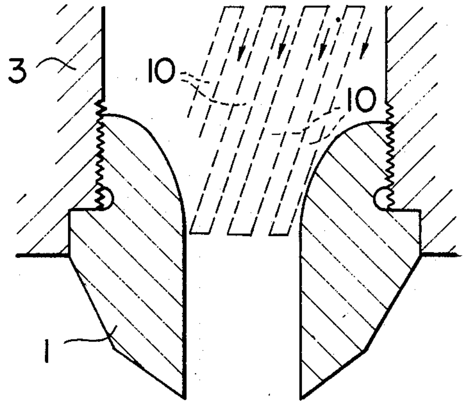
FIG. 4 is a section taken along the line IV—IV shown in FIG. 2.

FIG. 1 shows a longitudinal section of an embodiment of the transfer-type plasma torch of the present invention. In this embodiment, a cathode is mounted on a cathode-holding member through threads. FIG. 2 shows in detail the portion denoted by II in FIG. 1, FIG. 3 is a section taken along the line III—III shown in FIG. 2, and FIG. 4 is a section taken along the line IV—IV shown in FIG. 2.

Figure 5:
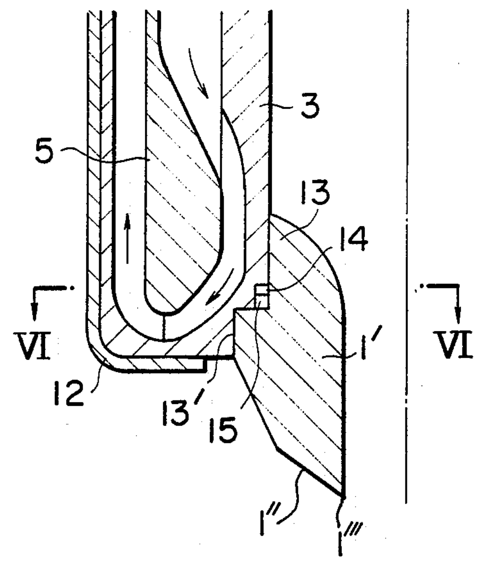
FIG. 5 is a view corresponding to FIG. 2, which shows another embodiment of the transfer-type plasma torch of the present invention.
Figure 6:
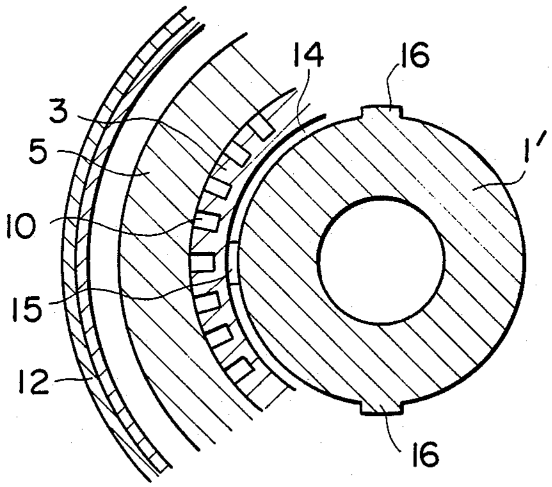
FIG. 6 is a section taken along the line VI—VI shown in FIG. 5.
Figure 7:
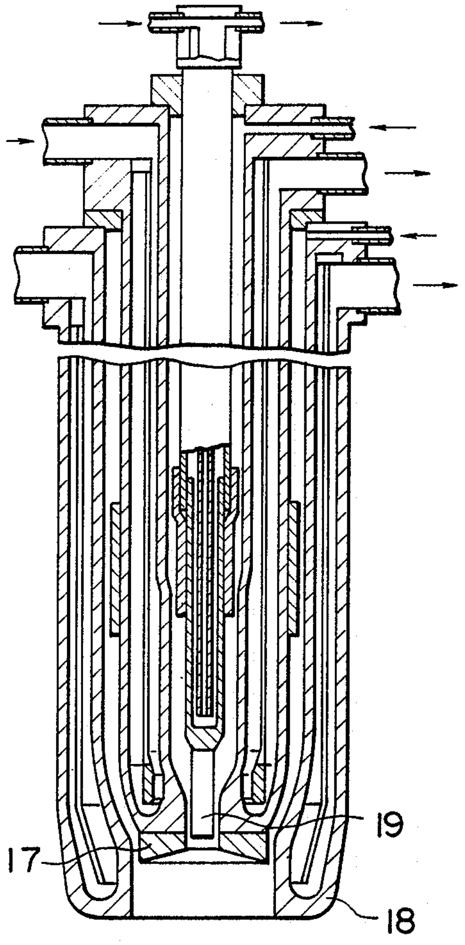
Figure 8:
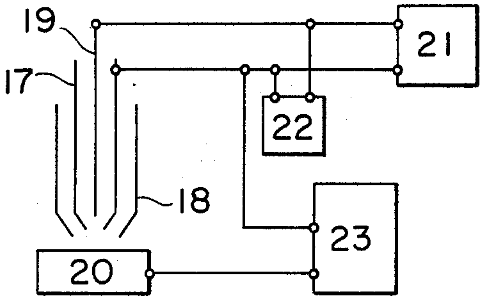
Figure 9A:
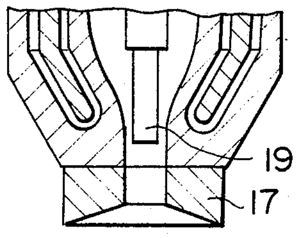
Figure 9B:
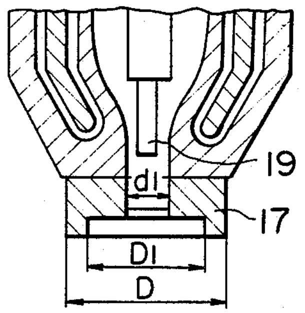
Figure 9C:
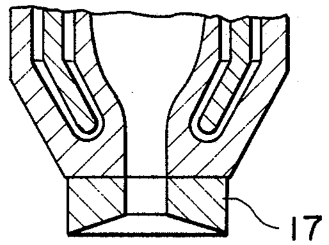

In another embodiment shown in FIG. 5, a cathode is mounted on a cathode-holding member through fitting engagement. FIG. 6 is a section taken along the line VI—VI shown in FIG. 5.

The embodiment shown in FIGS. 1 to 4 will be described first. In these figures, reference numeral 1 denotes a cathode mounted on a cathode-holding member 3 by threading it into a threaded engagement portion 11 formed in the inner periphery of the member 3. Before the mounting, silver solder is applied to the threaded engagement portion 11 so as to enhance the electric conductivity and the coefficient of heat transfer. Silver solder is also applied to a fitting engagement portion 13′ below the threaded engagement portion 11.

The cathode-holding member 3 has an arrangement in which the member 3 is cooled by a coolant. An internal cylinder 5 disposed within the cathode-holding member 3 partitions a space 7 allowing the flow of a coolant. The coolant flows within the space 7 in the direction indicated by the arrows, thereby cooling the cathode 1 and the bottom surface and the outer peripheral surface of the cathode-holding member 3.

In order to enhance the effect of cooling the threaded portion 11 and the fitting portion 13′, with which the cathode 1 engages, a plurality of coolant flow grooves 10 are provided. These grooves 10 serve as means for increasing the heat transfer area, for increasing the coolant flow rate, and for enabling uniform cooling.

If the grooves 10 are formed helically, as shown in FIG. 4, it is possible to further enhance the cooling effect.

The plasma torch shown in FIG. 1 also has an anode 2 for ignition, and a member 4 for holding the ignition anode 2. The ignition anode holding member 4 has a coolant flow space 8 partitioned by an inner cylinder 6 disposed therein, and is cooled by a coolant flowing in the space 8. A processing gas flow passage 9 is defined by a space formed by the cathode-holding member 3, the ignition anode holding member 4, the ignition anode 2, and the inner side of the cathode 1. A processing gas flows in the direction indicated by the arrows into the passageway within the cathode 1 to be discharged.

An insulator 12 coveres the bottom surface and the outer peripheral surface of the cathode-holding member 3, so as to prevent any arc discharge from this member 3.

The cathode 1 of the plasma torch of the present invention has its tip portion projecting from the bottom face of the cathode-holding member 3 by an amount of 5 to 30 mm, so that the electric field concentrates on the end face of the cathode 1 and an arc spot is formed thereon.

Since the position of the ignition anode 2 is determined to be above the cathode 1, the tip of the ignition anode 2 is prevented from becoming melted and wasted by a main arc generated between the cathode 1 and an object to be heated.

Next, descriptions will be given concerning the manner in which a plasma arc is generated by the plasma torch of the present invention.

First, at the time of ignition, a high-frequency high voltage is applied between the cathode 1 and the ignition anode 2, thereby causing electric discharge between these electrodes. Subsequently, a DC voltage is applied using the cathode 1 as the minus electrode and the ignition anode 2 as the plus electrode, thereby generating a pilot arc. Thereafter, the application of the high-frequency high voltage is terminated.

Subsequently, a DC voltage is applied by using the cathode 1 as the minus electrode and an object to be heated (not shown) as the plus electrode, thereby generating a main arc between these members. Thereafter, the application of DC voltage between the cathode 1 and ignition anode 2 is terminated, thereby extinguishing the pilot arc. A processing gas which flows downward through the gap between the cathode 1 and the ignition anode 2 to be discharged acts to shield the ignition anode 2 from the cathode 1, thereby protecting the ignition anode 2. Even after the extinction of the pilot arc, the main arc remains stable on a tapered surface 1″ at the tip of the cathode 1. Since the tapered surface 1″ at this tip is annular, it is possible to ensure a large area for the discharge of thermoelectrons which are to be supplied to the main arc. Consequently, the arc current density can be reduced, thereby enabling low level of waste even with a large arc current. In order to ensure that the arc spot is formed with an annular configuration and in a stable manner at the tip of the cathode 1, the cathode 1 should preferably have a certain configuration at the tip portion thereof, in which the radius of the ring-shaped cathode 1 is minimum at the distal edge 1‴.

The torch having the above-described arrangement was employed to perform operation using current of 6000 A for about three hours. As a result, it was found that the arc spot was stable without any nozzle, and that the level of waste was low.

Another embodiment, which is distinguished by the manner in which the cathode is mounted, will be described with reference to FIGS. 5 and 6.

In this embodiment, a cathode 1′is mounted on a cathode-holding member 3′, but it is not mounted through threads but through fitting engagement employing engagement portions 16. Specifically, an engagement groove 14 is formed in an inner periphery of the cathode-holding member 3′, and the engagement portions 16 provided on the cathode 1′ are fitted into the groove 14, thereby preventing any dropping off of the cathode 1′.

During the mounting of the cathode 1′ on the cathode-holding member 3′, the cathode 1′ is inserted into the cathode-holding member 3′ in such a manner that the engagement portions 16 of the cathode 1' are fitted into notches 15 formed in the cathode-holding member 3', thereby positioning the engagement portions 16 in the engagement groove 14. Thereafter, the cathode 1' is rotated until the engagement portions 16 are fixed at positions each distant from the notches 15.

Silver solder is applied simultaneously with the insertion of the cathode 1'.

As will be clear from the foregoing descriptions, the present invention provides the following significant effects:

(a) A conventionally-used nozzle is unnecessary. This makes it possible to eliminate not only the nozzle body but also the nozzle cooling system and the system for supplying a processing gas into the gap between the nozzle and the cathode. Thus, the transfer-type plasma torch of the present invention is simple and compact.

(b) The diameter of the plasma torch can be about one third of that of conventional plasma torches. This makes it possible to install the torch within a narrow space.

(c) It is possible to save nozzle cooling water as well as a large amount of processing gas.

(d) The plasma does not lose its stability even when the pilot arc is extinguished immediately after the ignition of the main arc.

(e) The combination of the reduction in diameter of the torch, the sufficient cooling of the cathode, and the mounting of the cathode by threading or fitting method brings forth advantages such as low level of thermal stress. Low thermal stress and other advantages enable the diameter of the cathode to be set at a much larger dimension as compared to those conventionally adopted, thereby achieving a large capacity for arc current.

(f) The cooling grooves formed in the cathode-holding member allow the cathode to be cooled very effectively, thereby enabling a great increase in usable life of the cathode.

(g) If the cathode is held in position through threads or engagement portions, it is prevented from dropping off.

(h) If the outer peripheral surface and the bottom surface of the cathode-holding member are covered with an electric insulator, this helps to prevent any electric discharge from the cathode-holding member. In this case, therefore, the electric field is properly concentrated on the cathode, thereby enabling stable and highly efficient generation of a plasma arc.

What is claimed is:

1. A transfer-type plasma torch which has a cathode and an ignition anode and in which, after a trigger electric discharge has been produced between the cathode and the ignition anode, an electric discharge is effected between the cathode and an object to be treated that is set as the anode, said plasma torch comprising:

a cylindrical cathode-holding member having formed therein a space allowing for the flow of a coolant;

an ignition anode disposed within said cathode-holding member;

a ring-shaped cathode disposed on an inner periphery of said cathode-holding member and positioned below the tip of said ignition anode, with the tip portion of said cathode projecting downwardly from the bottom face of said cathode-holding member; and a gas flow passage defined by a space formed by an inner surface of said cathode-holding member and an outer surface of said ignition anode and along an inner surface of said ring-shaped cathode, said gas flow passage being the only gas flow passage, in the torch and said gas flow passage permitting introduction of a gas flow to said cathode, said gas flow passing along said inner surface of said cathode, such that said gas flow is introduced only interiorly of said cathode.

2. A transfer-type plasma torch according to claim 5, wherein said cathode-holding member comprises a closed-end double cylinder and an inner cylinder disposed in said double cylinder, a plurality of grooves being formed in the surface of the portion f said cathode-holding member which is opposite to that on which said cathode is mounted, said plurality of grooves and said inner cylinder defining a portion of said coolant flow space.

3. A transfer-type plasma torch according to claim 5, wherein an outer peripheral surface and a bottom surface of said cathode-holding member are covered with an electric insulator.

4. A transfer-type plasma torch according to claim 1, wherein said ring-shaped cathode is threaded into or fitted on said inner periphery of said cathode-holding member.

* * * * *